United States Patent [19]

Frawley et al.

[11] Patent Number: 5,327,744
[45] Date of Patent: Jul. 12, 1994

[54] INTEGRATED ENVIRONMENTAL CONTROL SYSTEM FOR A HELICOPTER

[75] Inventors: Robert C. Frawley, Shelton; Thomas Perrotta, Brookfield; Richard S. Barnard, Monroe, all of Conn.

[73] Assignee: United Technologies Corporation, Hartford, Conn.

[21] Appl. No.: 992,392

[22] Filed: Dec. 18, 1992

[51] Int. Cl.5 ............................................. F25D 9/00
[52] U.S. Cl. ................................... 62/401; 62/402; 62/78; 62/331; 62/DIG. 5; 454/71; 454/76; 454/77; 237/12.3 A
[58] Field of Search ............... 62/401, 402, 78, 331, 62/DIG. 5; 454/71, 76, 77; 237/12.3 A

[56] References Cited

U.S. PATENT DOCUMENTS

| | | | |
|---|---|---|---|
| 2,991,706 | 7/1961 | Best | 454/71 |
| 4,209,993 | 7/1980 | Rannenberg | 62/80 |
| 4,262,495 | 4/1981 | Gupta et al. | 62/402 |
| 4,312,191 | 1/1982 | Biagini | 62/402 |
| 4,419,926 | 12/1983 | Cronin et al. | 237/11 |
| 4,434,624 | 3/1984 | Cronin et al. | 62/402 X |
| 4,490,989 | 1/1985 | Keen | 62/243 |
| 4,674,704 | 6/1987 | Altoz et al. | 62/DIG. 5 |
| 4,769,051 | 9/1988 | Defrancesco | 55/179 |
| 4,829,775 | 5/1989 | Defrancesco | 62/402 X |
| 4,978,064 | 12/1990 | Steiner | 237/12.3 A |
| 5,014,518 | 5/1991 | Thompson et al. | 62/402 X |
| 5,121,610 | 6/1992 | Atkinson et al. | 62/402 X |
| 5,151,022 | 9/1992 | Emerson et al. | 62/401 X |
| 5,165,597 | 11/1992 | Steiner | 237/12.3 A |

FOREIGN PATENT DOCUMENTS 850358 10/1960 United Kingdom ................. 454/76

Primary Examiner—Henry A. Bennet
Assistant Examiner—Christopher B. Kilner
Attorney, Agent, or Firm—Terrance J. Radke

[57] ABSTRACT

A compact, lightweight integrated environmental control (IEC) system for a helicopter incorporates in operative combination an environmental control system (ECS) and a nuclear/biological/chemical life support system (NBC LSS). The IEC system includes a refrigerant subsystem, a regenerative heat exchange apparatus, a decontamination subsystem, and an airflow distribution network, and is operative to provide super-cooled, super-dry, decontaminated airflow, in seriatim, directly to left and right mission equipment package bays and the cockpit for cooling of avionics/electronic modules and crew comfort. The IEC system is further operative to directly provide cooled, super-dry, decontaminated airflow for cooling of avionics/electronic modules of the mid mission equipment package bay and for over pressurizing the left and right mission equipment package bays to preclude contaminant infiltration thereof.

13 Claims, 2 Drawing Sheets

INTEGRATED ENVIRONMENTAL CONTROL SYSTEM FOR A HELICOPTER

TECHNICAL FIELD

The present invention is directed to environmental control systems for helicopters, and more particularly, to an integrated environmental control system that combines an environmental control system and a nuclear/biological/chemical life support system in a unitary, compact, lightweight airflow processing system that provides super-cooled, super-dry, decontaminated airflow, in seriatim, to mission equipment package bays and the cockpit of a helicopter for cooling of avionics/electronic modules and crew comfort.

BACKGROUND OF THE INVENTION

Most modern day helicopters are high technology aircraft that incorporate a plethora of avionics/electronic modules that markedly improve the overall capabilities of the helicopter, enhance the flight operations thereof, and/or reduce the pilot/co-pilot workloads. As is well known, operation of these modules generates a large quantity of thermal energy that must be effectively dissipated, i.e., by cooling, to ensure continuous, reliable operation of the avionics/electronic modules. To dissipate such thermal energy, helicopters typically include an environmental control system (ECS) that provides a temperature/pressure regulated airflow for cooling of the avionics/electronic modules. The regulated airflow is generally further utilized for crew comfort, and may be used for over pressurizing the helicopter to preclude contaminant infiltration.

Military aircraft, especially helicopters, that are utilized for combat flight operations may be exposed to chemical, biological, and/or nuclear hazards. As a result, such aircraft are typically equipped with a nuclear/biological/chemical life support system (NBC LSS) to facilitate combat flight operations under such hazardous conditions. The NBC LSS ensures that NBC particulates/contaminants are removed from the airflow processed by the ECS.

System design engineers are continually striving to enhance the efficiency of helicopter subsystems while concomitantly reducing the complexity and weight thereof. To this end, the ECS and NBC LSS of helicopters have been combined into an integrated environmental control system. The integrated environmental control systems of modern day military helicopters typically combine the ECS and the NBC LSS functions into a single system that provides a decontaminated, cooled airflow for cooling of avionics/electronic modules and crew comfort.

Helicopter system design engineers continue to work to optimize the structural and functional characteristics of such integrated environmental control systems. Prior art NBC systems utilized low pressure carbon filters to remove NBC particulates/contaminants. Carbon filter NBC systems, however, initially proved inappropriate for helicopter applications. In order for the NBC system to perform effectively, the carbon filter, perforce, was too large and heavy for helicopter applications, system weight being one of the primary design constraints for helicopters, particularly military helicopters. The effectiveness of carbon filters was increased and the size thereof reduced by increasing the operating pressure of the carbon filter. Increasing the operating pressure of the integrated environmental control system, however, caused a concomitant increase in the weight of the airflow ducting of the integrated environmental control system.

Moreover, even though NBC particulates/contaminants may be effectively removed utilizing a high pressure carbon filter, such filters do not remove a sufficient amount of the moisture content of the cooled, decontaminated airflow to facilitate effective utilization of such airflow. Typically, the cooled, decontaminated airflow exiting the ECS portion of the integrated environmental control system must be channeled in parallel paths to the aircraft cockpit and avionics/electronic modules to achieve the desired cooling effects due to the moisture content thereof. If such cooled, decontaminated airflow is directly utilized for cooling of avionics/electronic modules, there is a risk that such airflow will induce moisture condensation and/or freezing in the avionics/electronic modules. To negate the possibility of such effects due to the moisture content of the cooled, decontaminated airflow, the cooled, decontaminated airflow is further conditioned, e.g., by mixing warmer airflow with such airflow or utilizing a heat exchange apparatus to raise the temperature of the airflow slightly above freezing (32° F), prior to being utilized to cool the avionics/electronic modules.

The need to effect such downstream conditioning of the system airflow severely limits the overall efficiency of the integrated environmental control system. Firstly, the airflow cooling capacity of the ECS portion of the integrated environmental control system is not effectively utilized in light of the requirement for downstream conditioning, i.e., heating, of the cooling airflow. Secondly, the conditioned cooling airflow has a limited thermal cooling capacity that is essentially exhausted in cooling the avionics/electronic modules in mission equipment package bays. In light of this, the integrated environmental control system requires a second cooling airflow for the cockpit. The cooled, decontaminated airflow channeled directly to the cockpit, however, has a temperature that is generally too low for cockpit usage. Therefore, the cockpit cooling airflow is further conditioned by a heat exchange apparatus so as to raise the cockpit cooling airflow to a temperature that provides a comfortable cockpit environment. The components necessary to provide downstream conditioning of the cooled, decontaminated airflow, as well as the ducting required to provide parallel flowpaths of cooling airflow, and the size of such ducting in light of the reduced thermal cooling capacity of the conditioned airflow, increase the overall complexity and weight of prior art integrated environmental control systems.

It is known in the art to utilize a pressure swing adsorption (PSA) NBC filtration apparatus as part of an integrated environmental control system. A representative example of such a system is illustrated in U.S. Pat. No. 4,769,051. The PSA apparatus described in the '051 patent is operative not only to remove NBC particulates/contaminants from the generated airflow, but also to remove substantially all the moisture content thereof. That is, the PSA apparatus provides a super-dry, decontaminated airflow.

An examination of the integrated environmental control system described in the '051 patent, however, reveals that such system is not optimized for helicopter applications. The integrated environmental control system described in the '051 patent is a closed, two loop cooling system similar in structure and function to the closed, two loop cooling systems employed in nuclear reactors. A closed, two loop cooling system is not an optimum configuration for helicopter applications, requiring ancillary components and airflow ducting to effectuate the desired cooling function, which increases overall system weight, while concomitantly having a lower overall operating efficiency.

The cooled, super-dry, decontaminated airflow generated by the PSA apparatus and the air cycle machine described in the '051 patent is channeled through a first loop that passes through a load heat exchanger. A second loop, which includes the closed environment to be cooled, also passes through the load heat exchanger. The cooled, super-dry decontaminated airflow in the first loop is therefore utilized to indirectly cool the airflow of the second loop for subsequent cooling of the closed environment.

A need exists to provide an integrated environmental control system that has an improved operating efficiency and a lower overall system weight. The integrated environmental control system should provide a super-cooled, super-dry, decontaminated airflow and should be design optimized to fully utilize the thermal cooling capacity of the super-cooled, super-dry, decontaminated airflow for direct cooling of helicopter avionics/electronic modules and crew comfort.

SUMMARY OF THE INVENTION

One object of the present invention is to provide a unitary, compact, lightweight integrated environmental control (IEC) system for a helicopter comprised of an environmental control system and a nuclear/biological/chemical life support system that has an improved operating efficiency.

Another object of the present invention is to provide an IEC system for a helicopter that provides a super-cooled, super-dry, decontaminated airflow for cooling avionics/electronic modules and crew comfort.

Still another object of the present invention is to provide an IEC system that has an airflow distribution network that channels the super-cooled, super-dry, decontaminated airflow in seriatim to mission equipment package bays and the cockpit for direct cooling of the avionics/electronic modules thereof and for crew comfort.

These and other objects are achieved by one embodiment of an integrated environment control (IEC) system according to the present invention that includes a refrigerant subsystem and a decontamination subsystem that are operative in combination to provide a super-cooled, super-dry, decontaminated airflow. The IEC system further includes an airflow distribution network that is operative to channel the super-cooled, super-dry, decontaminated airflow in seriatim to mission equipment package bays and the cockpit for direct cooling of the avionics/electronic modules thereof and for crew comfort. Due to the characteristics of the cooling airflow provided by the described embodiment of the IEC system, the volumetric flowrate of cooling airflow required to properly cool the avionics/electronic modules is significantly reduced. This, in turn, means that lighter components may be used in the refrigerant subsystem portion of the IEC system. Further, the airflow distribution network may utilize smaller diameter distribution ducts in light of the reduced volumetric flowrate required. The foregoing features allow a significant reduction in overall weight of the described embodiment of the IEC system according to the present invention.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF PREFERRED EMBODIMENTS

Figure 1:
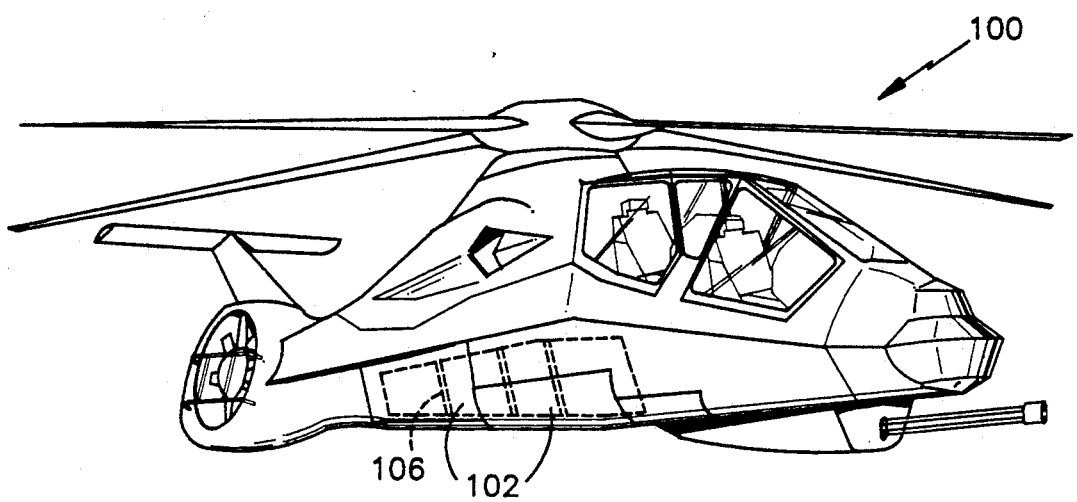
FIG. 1 is a perspective view of the RAH-66 Comanche helicopter.

Referring now to the drawings wherein like reference characters designate identical or similar elements throughout the several views, FIG. 1 is a perspective view of the RAH-66 Comanche helicopter 100 being developed by the team of Sikorsky Aircraft (a division of United Technologies Corporation) and Boeing Helicopters. The Comanche helicopter 100 has been configured with line-replaceable avionics/electronic modules (identified generally by reference numeral 102) located for easy accessibility in the fuselage in left and right mission equipment package (MEP) bays 104, 106 (see FIG. 2). Additional avionics/electronic modules are located in a mid MEP bay 108 located behind a cockpit 110 bulkhead. Further avionics/electronic modules are located within the cockpit 110.

Figure 2:
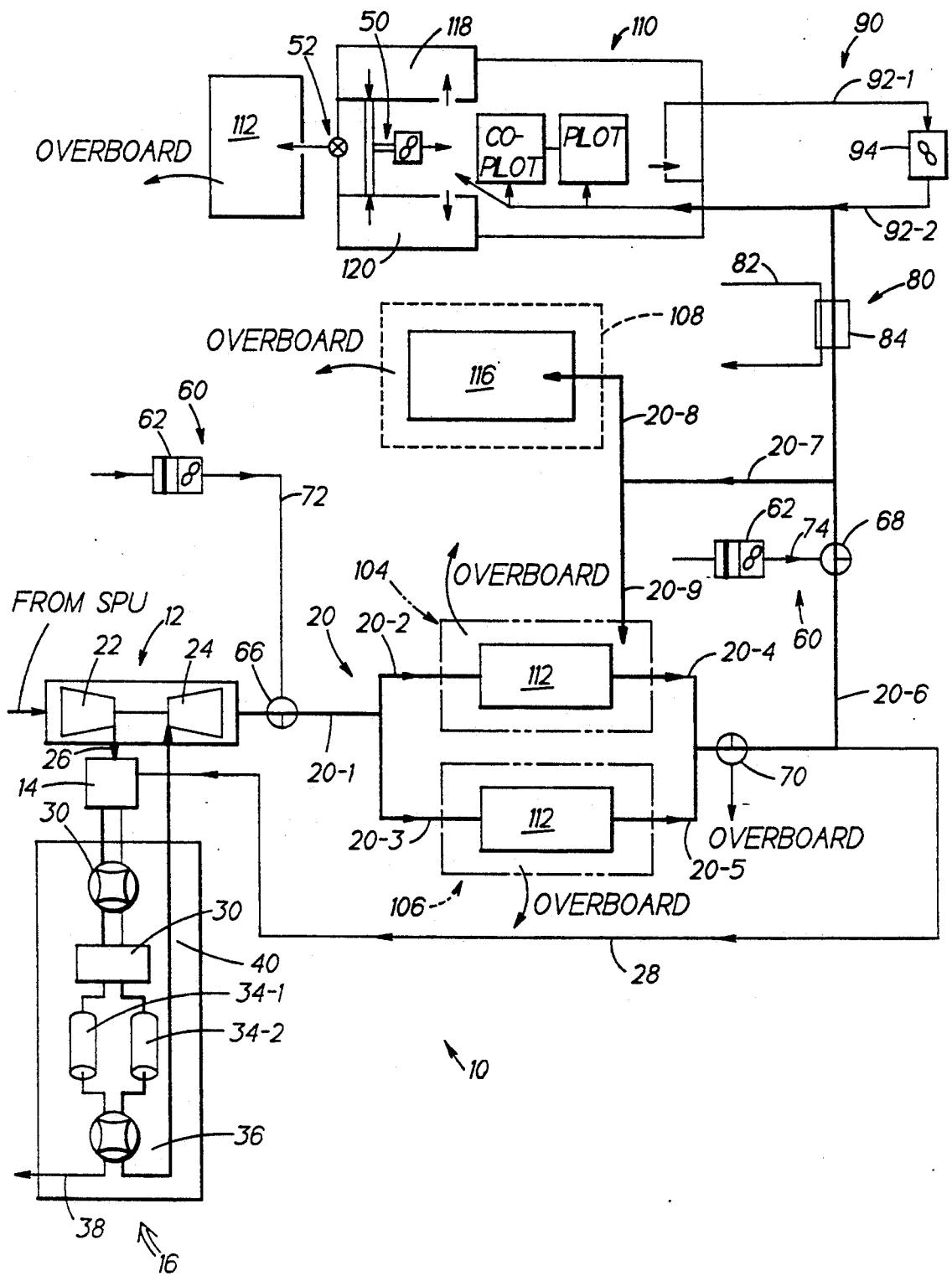
FIG. 2 is a schematic block diagram of an integrated environmental control system according to the present invention for the RAH-66 Comanche helicopter of FIG. 1.

An embodiment of an integrated environmental control (IEC) system 10, as illustrated in FIG. 2 and described hereinbelow in further detail, is design optimized for the RAH-66 helicopter 100, and incorporates in operative combination the components of an environmental control system (ECS) and a nuclear/biological/chemical life support system (NBC LSS). The IEC system 10 according to the present invention is operative to provide super-cooled, super-dry, decontaminated airflow, in seriatim, to the left and right MEP bays 104, 106 and to the helicopter cockpit 110 for cooling of avionics/electronic modules and crew comfort. The IEC system 10 is further operative to provide cooled, super-dry, decontaminated airflow for cooling the avionics/electronic modules in the mid MEP bay 108 and for over pressurizing the left and right MEP bays 104, 106 to prevent contaminant infiltration thereof. One skilled in the art will appreciate, moreover, that the IEC system 10 according to the present invention may be configured to provide super-cooled, super-dry, decontaminated airflow, in seriatim, for cooling avionics/electronic modules and crew comfort for helicopters having different avionics/electronic compartment and/or cockpit configurations.

The embodiment of the IEC system 10 according to the present invention is illustrated in FIG. 2, and includes a refrigerant subsystem 12, a regenerative heat exchange apparatus 14, a decontamination subsystem 16, and an airflow distribution network 20. The IEC system 10 provides a decontaminated, temperature regulated airflow for in seriatim cooling of the avionics/electronic modules of the left and right MEP bays 104, 106 and the helicopter cockpit 110, as well as for subsequent cooling of the avionics/electronic modules of the mid MEP bay 108 and over pressurization of the left and right MEP bays 104, 106 to prevent contaminant infiltration thereof. The IEC system 10 according to the present invention is an enhanced efficiency system that eliminates the need for ancillary heat exchange apparatus and reduces the overall aircraft system weight.

The refrigerant subsystem 12 is operative to provide compressed airflow to the regenerative heat exchange apparatus 14 and, in combination with the decontamination subsystem 16, to provide super-cooled, super-dry, decontaminated airflow to the airflow distribution network 20. Compressed airflow is supplied to the refrigerant subsystem 12 from a subsystem power unit (SPU) of the helicopter 100 (engine bleed air of the RAH-66 Comanche helicopter was determined not to have sufficient inherent energy for utilization in the IEC system 10). The SPU, which is functionally similar to an auxiliary power unit (APU), is operative during helicopter operations to provide compressed airflow to the refrigerant subsystem 12.

The refrigerant subsystem 12 for the embodiment of the IEC system 10 described herein is an air cycle machine (ACM) that includes a compressor stage 22 and a turbine stage 24. The regenerative heat exchange apparatus 14 and the decontamination subsystem 16 are operatively interposed between the compressor stage 22 and the turbine stage 24 of the ACM 12. The compressor stage 22 is operative to increase the pressure of the compressed airflow supplied by the SPU. The highly compressed airflow from the compressor stage 22 is channeled to and through the regenerative heat exchange apparatus 14 to the decontamination subsystem 16 via a flow duct 26.

The regenerative heat exchange apparatus 14 is operative to transfer thermal energy from the highly compressed airflow from the ACM 12 in flow duct 26 to a thermally adjacent leg of a purge duct 28. The purge duct 28 accommodates purge airflow bled from the airflow distribution network 20, the purge airflow being utilized for purging the decontamination subsystem 16, as described hereinbelow. The regenerative heat exchange apparatus 14 is operative to raise the purge airflow in purge duct 28 to a predetermined temperature that facilitates the purging process occurring in the decontamination subsystem 16.

The decontamination subsystem 16 of the described embodiment of the IEC system 10 is a pressure swing adsorber (PSA) NBC filtration apparatus of the type known in the art. The PSA apparatus 16 comprises an inlet transfer valve 30, a high efficiency particulate air (HEPA) filter 32, two regenerative beds 34-1, 34-2 of the type described in U.S. Pat. No. 4,769,052, and available from the Pall Corporation, New York, and an outlet transfer valve 36. The PSA apparatus 16 is operative to remove particulate, liquid, and/or gaseous contaminants from the highly compressed airflow provided by the flow duct 26. In particular, the PSA apparatus 16 is operative to remove substantially all moisture content from the highly compressed airflow.

The inlet transfer valve 30 is operative to alternatively direct the compressed airflow from the flow duct 26 through the HEPA filter 32 to one of beds (34-2 as illustrated in FIG. 2) of the PSA apparatus 16 and the purge airflow from the purge duct 28 through the other bed (34-1 as illustrated in FIG. 2) and vice versa. Particulate, liquid, and gaseous contaminants, and in particular the moisture content, of the highly compressed airflow are removed therefrom by means of the combination of the HEPA filter 32 and the active bed (34-2). Concomitantly, the contaminated bed (34-1) is being purged of entrapped contaminants by means of the purge airflow. Once the active bed is saturated, and/or the contaminated bed is purged of contaminants, the inlet transfer valve 30 is activated to redirect the highly compressed airflow and the purge airflow through the newly-purged bed and the newly-contaminated bed, respectively. The HEPA filter 32 and two regeneration beds 34-1, 34-2 thus provide a means for continuously decontaminating the highly compressed airflow, as well as removing substantially all moisture content thereof, from the compressor stage 22 of the ACM 12.

The outlet transfer valve 36 is operative to direct the contaminated purge airflow into an exhaust duct 38 so that the contaminated airflow is dumped overboard. The outlet transfer valve 36 is concomitantly operative to direct the super-dry, decontaminated airflow produced by the PSA apparatus 16 to the turbine stage 24 of the ACM 12 by means of a flow duct 40. The automatic flight control system computer (not illustrated) of the helicopter 100 may be utilized to synchronously regulate the switching operations of the inlet and outlet transfer valves 30, 36 to accommodate the foregoing functions. The turbine stage 24 is operative to extract thermal energy from the super-dry, decontaminated airflow of flow duct 40 (by expansion of the super-dry, decontaminated airflow) to provide a super-cooled, super-dry, decontaminated airflow to the airflow distribution network 20. For the described embodiment of the IEC system 10 for the RAH-66 helicopter 100, the super-cooled, super-dry, decontaminated airflow provided to the airflow distribution network 20 by the turbine stage 24 of the ACM 12 has a volumetric flowrate of about 33 ppm, a temperature of approximately $-30°$ F. to $-40°$ F., a pressure of about $1-1\frac{1}{2}$ psig, and substantially 0% moisture content (a dew point of about $-100°$ F. to $-130°$ F.). The turbine stage 24 also provides the necessary power to drive the compressor stage 22.

The airflow distribution network 20 comprises a plurality of distribution ducts that are operative to channel the super-cooled, super-dry, decontaminated airflow from the refrigerant subsystem 12, in seriatim, directly to the left and right MEP bays 104, 106 and the cockpit 110 for cooling the avionics/electronic modules and crew comfort. In addition, due to the initial thermal cooling capacity of the super-cooled, super-dry, decontaminated airflow, the distribution network 20 is further operative to directly provide cooled, super-dry, decontaminated airflow (the cooling airflow discharged from the left and right MEP bays 104, 106) for cooling the avionics/electronic modules in the mid MEP bay 108 and for over pressurizing the left and right MEP bays 104, 106 to prevent contaminant infiltration thereof. Due to the super-dry characteristic of the cooling airflow in the distribution network 20, there is little likelihood of moisture condensation and/or freezing when the super-cooled, super-dry, decontaminated airflow encounters the avionics/electronic modules in the left and right MEP bays 104, 106, the mid MEP bay 108, and/or the cockpit 110.

Thus, the airflow may be used directly (without the need for a supplemental heat exchange apparatus to heat the airflow to preclude moisture condensation and/or freezing) to provide cooling for the avionics/electronic modules. Furthermore, due to the enhanced thermal cooling capacity of the super-cooled, super-dry, decontaminated airflow, the volumetric flowrate of the airflow required for proper cooling of the avionics/electronic modules is drastically reduced.

This, in turn, means that lighter components may be used for the ECS portion of the IEC system 10. More importantly, the airflow distribution network 20 can incorporate smaller diameter distribution ducts. These features in combination allow a significant reduction in overall weight of the IEC system 10.

A first distribution duct 20-1 channels the airflow from the turbine stage 24 of the ACM 12 to the left and right MEP bays 104, 106. The airflow in the first distribution duct 20-1 is channeled to upstream parallel distribution ducts 20-2, 20-3, which direct the airflow through the left and right MEP bays 104, 106, respectively, for cooling the avionics/electronic modules therein. For the described embodiment of the IEC system 10, the super-cooled, super-dry, decontaminated airflow is directly utilized to provide conductive cooling of the avionics/electronic modules by means of MEP bay coldplates 112, 114. The coldplates 112, 114 are utilized in the described embodiment of the IEC system 10 for the Comanche helicopter 100 to ensure that the avionics/electronic modules are not physically exposed to any contaminants remaining in the super-cooled, super-dry, decontaminated airflow. It will be appreciated, however, that the super-cooled, super-dry, decontaminated airflow may alternatively be directed through the avionics/electronic modules for convective cooling thereof.

The coldplates 112, 114 are configured to provide closed flowpaths for the super-cooled, super-dry, decontaminated airflow so that the cooling airflows are physically isolated from the avionics/electronic modules. The avionics/electronic modules are physically attached to the respective coldplates 112, 114 so as to provide thermally conductive pathways therebetween. The super-cooled, super-dry, decontaminated airflow through the coldplates 112, 114 in the left and right MEP bays 104, 106, respectively, convectively cools the coldplates 112, 114. The coldplates 112, 114, in turn, provide conductive cooling of the avionics/electronic modules in the left and right MEP bays 104, 106 so as to maintain the avionic/electronic modules at proper operating temperatures.

The airflow discharged from the coldplates 112, 114 is a cooled (for the described embodiment of the IEC system 10, about 50°-60° F.), super-dry, decontaminated airflow. This airflow has sufficient thermal cooling capacity to provide cooling of avionics/electronic modules in the mid MEP bay 108 and for the avionics/electronic modules in the cockpit 110 as well as providing crew comfort. The airflow is channeled, by means of downstream parallel distribution ducts 20-4, 20-5, to a common distribution duct 20-6. The common distribution duct 20-6 is operative to channel the cooled, super-dry, decontaminated airflow to the cockpit 110.

The purge duct 28 described hereinabove is interconnected to the common distribution duct 20-6 downstream of the left and right MEP bays 104, 106 and operative to bleed off a portion of the cooled, super-dry airflow to provide the purge airflow for the purging process of the PSA apparatus 16. A diverter duct 20-7 is interconnected to the common distribution duct 20-6 to bleed of another portion of the cooled, super-dry, decontaminated airflow for cooling the avionics/electronic modules in the mid MEP bay 108 and for over pressurizing the left and right MEP bays 104, 106.

Airflow in the diverter duct 20-7 is channeled to a coldplate 116 in the mid MEP bay 108 by means of a first subdistribution duct 20-8. The mid MEP bay coldplate 116 is equivalent in structure and function to the coldplates 112, 114 described hereinabove, being operative to conductively cool avionics/electronic modules in the mid MEP bay 108 so as to maintain the avionic/electronic modules at proper operating temperatures. The airflow exiting the coldplate 116 is dumped overboard. The airflow in the diverter duct 20-7 is also channeled into the left and right MEP bays 104, 106 by means of a second subdistribution duct 20-9, and subsequently dumped overboard. The airflow from the second subdistribution duct 20-9 is utilized to over pressurize the left and right MEP bays 104, 106 to prevent contaminant infiltration thereof.

The cooled, super-dry, decontaminated airflow channeled into the cockpit 110 by means of the common distribution duct 20-6 is utilized for crew comfort. In addition, such airflow is circulated through avionics/equipment bays 118, 120 in the cockpit 110 for cooling of avionics/electronic modules disposed therein. The cooling airflow channeled into the avionics/equipment bays 118, 120 may be recirculated into the cockpit 110 proper by means of a circulation subsystem 50 (comprising ducting from the bays 118, 120 and a common circulation fan, as illustrated in FIG. 2). The cockpit 110 further includes a pressure control valve 52 that is operative to channel excessive cockpit cooling airflow to an electro-optical sensor system 122 for cooling thereof, such airflow being subsequently dumped overboard.

The described embodiment of the IEC system 10 for the Comanche helicopter 100 further includes an ambient back-up subsystem 60 that includes first and second means 62, 64 for providing pressurized airflow, first and second cut-in valves 66, 68, a dump valve 70, and interconnect ducts 72, 74. The ambient back-up subsystem 60 is operative, in response to a loss of the functional capability of the IEC system 10, i.e., loss of cooling airflow due to malfunctioning and/or shutdown of the ACM 12 and/or the PSA apparatus 16, to provide pressurized airflows that provide a minimal level of cooling for the avionics/electronic modules of the left, right, and mid MEP bays 104, 106, 108 and the cockpit 110 so as to maintain the avionics/electronic modules in an operating condition, and for minimal crew comfort.

The first means 62, the first interconnect duct 72, the first cut-in valve 66, and the dump valve 70 are operative in combination to provide a first pressurized airflow for providing a minimal level of cooling of the avionics/electronic modules of the left and right MEP bays 102, 104. The first means 62 utilizes ambient air to provide the first pressurized airflow, which is channeled to the first distribution duct 20-1 by means of the first interconnect duct 72 and the first cut-in valve 66. The distribution scheme of the first pressurized airflow for the left and right MEP bays 104, 106 is equivalent to the distribution scheme of the super-cooled, super-dry, decontaminated airflow described hereinabove. Functionally, however, the first pressurized airflow provides only a minimal level of cooling for the avionics/electronic modules due to its diminished thermal cooling capacity. In addition, the first pressurized airflow is not decontaminated, and has a moisture content substantially equivalent to the ambient air. Since purge airflow is not required under these circumstances, and inasmuch as the thermal cooling capacity of the first pressurized airflow is limited, the dump valve 70 is operative to dump the first pressurized airflow overboard immediately downstream of the left and right MEP bays 104, 106.

The second means 64, the second interconnect duct 74, and the second cut-in valve 68 are operative in combination to provide a second pressurized airflow for providing a minimal level of cooling for the avionics/electronic modules of the mid MEP bay 108 and the cockpit 110 and for crew comfort. The second means 64 utilizes ambient air to provide the second pressurized airflow, which is channeled to the common distribution duct 20-6 by means of the second interconnect duct 74 and the second cut-in valve 68. The distribution scheme of the second pressurized airflow is equivalent to the distribution scheme of the cooled, super-dry, decontaminated airflow described hereinabove. Functionally, however, the second pressurized airflow provides only a minimal level of cooling for the avionics/electronic modules and crew comfort due to its diminished thermal cooling capacity. In addition, the second pressurized airflow is not decontaminated, and has a moisture content substantially equivalent to the ambient air.

The described embodiment of the IEC system 10 may further include an auxiliary heat exchange subsystem 80 that comprises a bleed air duct 82 and a heat exchange apparatus 84. The auxiliary heat exchange subsystem 80 is operative to heat the cooled, super-dry, decontaminated air provided to the cockpit 110 via the common distribution duct 20-6 for crew comfort during cold weather flight operations. The bleed air duct 82 channels bleed airflow from the helicopter engines (not identified) to the heat exchange apparatus 84. The heat exchange apparatus 84 is operative to transfer thermal energy from the bleed airflow in the bleed air duct 82 to the cooled, super-dry, decontaminated airflow in the common distribution duct 20-6 to raise the temperature thereof for crew comfort.

The described embodiment of the IEC system 10 may also include a recirculation subsystem 90 that includes recirculation ducting 92-1, 92-2 and a recirculating fan 94. The recirculation subsystem 90 is operative to recirculate the cooled, super-dry, decontaminated airflow that has been introduced into the cockpit 110 proper via the common distribution duct 20-6.

A variety of modification and variations are possible in light of the above teachings. It is therefore to be understood that, within the scope of the appended claims, the invention may be practiced otherwise than as specifically described hereinabove.

What is claimed is:

1. An integrated environmental control system for a helicopter having a plurality of mission equipment package bays containing electronic modules, the helicopter having a cockpit that contains electronic modules, comprising:
   a refrigerant subsystem operative to provide a highly compressed airflow;
   a decontamination subsystem operative to decontaminate and demoisturize said highly compressed airflow from said refrigerant subsystem to provide a super-dry, decontaminated airflow;
   said refrigerant subsystem being further operative to super cool said super-dry, decontaminated airflow from said decontamination subsystem to provide a super-cooled, super-dry, decontaminated airflow; and
   an airflow distribution network operative to channel said super-cooled, super-dry, decontaminated airflow, in seriatim, to at least one of the plurality of mission equipment package bays and the cockpit for direct cooling of the electronic modules thereof and crew comfort.

2. The integrated environmental control system of claim 1 wherein said airflow distribution network further comprises ducting means downstream of the at least one mission equipment bay for diverting cooled, super-dry, decontaminated airflow discharged from the at least one mission equipment bay to another of the plurality of mission equipment bays for directly cooling the electronic modules thereof.

3. The integrated environmental control system of claim 2 wherein said ducting means is further operative to channel said cooled, super-dry, decontaminated airflow to the at least one mission equipment bay for over pressurization thereof to prevent contaminant infiltration thereof.

4. The integrated environmental control system of claim 2 further comprising heat exchanging apparatus means disposed in operative combination with said airflow distribution network upstream of the cockpit for heating said cooled, super-dry, decontaminated airflow discharged from the at least one mission equipment package bay for crew comfort during cold weather flight operations.

5. The integrated environmental control system of claim 1 further comprising an ambient back-up subsystem fluidically interconnected to said airflow distribution network for providing emergency cooling airflow to the at least one mission equipment package bay and the cockpit for cooling the electronic modules thereof and crew comfort.

6. An integrated environmental control system for a helicopter having left, right, and mid mission equipment package bays containing electronic modules, the helicopter having a cockpit that includes electronic modules, comprising:
   an air cycle machine that includes a compressor stage and a turbine stage, said compressor stage being operative to provide a highly compressed airflow;
   means for providing a purge airflow;
   a regenerative heat exchange apparatus operative to transfer thermal energy from said highly compressed airflow to said purge airflow;
   a pressure swing adsorber nuclear/biological/chemical filtration apparatus that includes a high efficiency particulate air filter and first and second alternatively operative regenerative beds operative in combination to decontaminate and demoisturize said highly compressed airflow to provide a super-dry, decontaminated airflow, said second and first beds being alternatively purged of contaminants by said purge airflow;
   said turbine stage of said air cycle machine being operative to super cool said super-dry, decontaminated airflow to provide a super-cooled, super-dry, decontaminated airflow; and
   an airflow distribution network operative to channel said super-cooled, super-dry, decontaminated airflow, in seriatim, to the left and right mission equipment package bays and the cockpit for direct cooling of the electronic modules thereof and crew comfort,
   said airflow distribution network including
      a first distribution duct for channeling said super-cooled, super-dry, decontaminated airflow to the left and right mission equipment package bays, upstream parallel distribution ducts fluidically interconnected to said first distribution duct for directing said super-cooled, super-dry, decontaminated airflow through the left and right mission equipment package bays, respectively, for directly cooling the electronic modules thereof, and downstream parallel distribution ducts for receiving cooled, super-dry, decontaminated airflow discharged from the left and right mission equipment package bays, respectively, and a common distribution duct fluidically interconnected to said downstream parallel distribution ducts for channeling said cooled, super-dry, decontaminated airflow to the cockpit for cooling the electronic modules therein and for crew comfort.

7. The integrated environmental control system of claim 6 wherein said airflow distribution network further comprises a diverter duct fluidically interconnected to said common distribution duct, and a first subdistribution duct fluidically interconnected to said diverter duct and to the mid mission equipment package bay, said diverter duct and first subdistribution duct in combination being operative to channel a first portion of said cooled, super-dry, decontaminated airflow from said common distribution duct to the mid mission equipment package bay for directly cooling the electronic modules thereof.

8. The integrated environment control system of claim 7 wherein said airflow distribution network further comprises a second distribution duct fluidically interconnected to said diverter duct and the left and right mission equipment package bays, said diverter duct and said second distribution duct in combination being operative to channel a second portion of said cooled, super-dry, decontaminated airflow from said common distribution duct to the left and right mission equipment package bays for over pressurization thereof to preclude contaminant infiltration thereof.

9. The integrated environmental control system of claim 6 further comprising a subsystem power unit fluidically interconnected to said compressor stage of said air cycle machine and operative to provide compressed airflow to said compressor stage of said air cycle machine during helicopter operations, said compressor stage being operative to compress said compressed airflow to provide said highly compressed airflow.

10. The integrated environmental control system of claim 6 wherein said purge airflow providing means comprises a purge duct fluidically interconnected to said common distribution duct downstream of the left and right mission equipment package bays and said pressure swing adsorber nuclear/biological/chemical filtration apparatus, said purge duct being disposed in a thermally adjacent relationship with said regenerative heat exchange apparatus.

11. The integrated environmental control system of claim 6 wherein said airflow distribution networks further comprise left and right coldplates disposed in the left and right mission equipment package bays and fluidically interconnected respectively to said upstream and downstream parallel distribution ducts, the electronic modules of the left and right mission equipment package bays being physically attached to said left and right coldplates, respectively, so as to provide thermally conductive pathways therebetween.

12. The integrated environmental control system of claim 6 further comprising an ambient back-up subsystem fluidically interconnected to said first distribution duct and said common distribution duct, respectively, and operative to provide emergency cooling airflow to the left and right mission equipment package bays and the cockpit, respectively, for cooling the electronic modules thereof and crew comfort.

13. The integrated environmental control system of claim 6 further comprising an auxiliary heat exchange subsystem disposed in combination with said common distribution duct and operative to heat said cooled, super-dry, decontaminated air provided to the cockpit via said common distribution duct for crew comfort during cold weather flight operations.

* * * * *